(12) United States Patent
Mikolajczak et al.

(10) Patent No.: US 9,569,027 B2
(45) Date of Patent: Feb. 14, 2017

(54) IMPLEMENTING A HIDDEN TOUCH SURFACE

(71) Applicants: Matthew Mikolajczak, Novi, MI (US); Royce D. Channey, Ann Arbor, MI (US); James Kornacki, Dearborn, MI (US)

(72) Inventors: Matthew Mikolajczak, Novi, MI (US); Royce D. Channey, Ann Arbor, MI (US); James Kornacki, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 467 days.

(21) Appl. No.: 14/104,778

(22) Filed: Dec. 12, 2013

(65) Prior Publication Data

US 2015/0169115 A1    Jun. 18, 2015

(51) Int. Cl.
*G06F 3/00* (2006.01)
*G06F 3/041* (2006.01)
*G06F 3/0354* (2013.01)

(52) U.S. Cl.
CPC ......... *G06F 3/0414* (2013.01); *G06F 3/03547* (2013.01); *B60K 2350/1024* (2013.01)

(58) Field of Classification Search
CPC .... H04L 65/403; H04L 67/04; H04L 67/1095; G06F 3/0482; G06F 3/0485
USPC ....................................................... 715/753
See application file for complete search history.

(56) References Cited

U.S. PATENT DOCUMENTS

| | | | | |
|---|---|---|---|---|
| 5,548,306 A * | 8/1996 | Yates, IV | ................ | G06F 3/044 345/174 |
| 6,610,936 B2 | 8/2003 | Gillespie et al. | | |
| 8,245,158 B1 * | 8/2012 | Schrick | ................ | G06F 1/1626 715/710 |
| 8,321,802 B2 * | 11/2012 | Rogers | ................ | G06F 3/04817 715/769 |
| 8,806,362 B2 * | 8/2014 | Ording | .................. | G06F 3/0236 345/168 |
| 8,812,983 B2 * | 8/2014 | VanBlon | ............... | G06F 3/0488 715/810 |
| 8,812,995 B1 * | 8/2014 | Murphy | ................ | G06F 3/0488 715/764 |
| 9,092,125 B2 * | 7/2015 | Michaelis | ........... | G06F 3/04845 |
| 9,200,915 B2 * | 12/2015 | Vulcano | .................. | G01C 21/36 |
| 9,239,673 B2 * | 1/2016 | Shaffer | .................... | G06F 3/038 |
| 9,280,239 B2 * | 3/2016 | Rosener | .................. | G06F 3/044 |
| 2006/0161846 A1 * | 7/2006 | Van Leeuwen | ..... | G06F 3/04842 715/702 |
| 2009/0158197 A1 * | 6/2009 | Hollemans | ............ | G06F 3/0482 715/781 |
| 2010/0295812 A1 | 11/2010 | Burns et al. | | |
| 2014/0304651 A1 * | 10/2014 | Johansson | .............. | G06F 3/0482 715/810 |
| 2015/0169115 A1 * | 6/2015 | Mikolajczak | ......... | G06F 3/0414 345/173 |

* cited by examiner

*Primary Examiner* — David Phantana Angkool
(74) *Attorney, Agent, or Firm* — Dickinson Wright PLLC

(57) ABSTRACT

A system and method for implementing a hidden touch surface are provided. The system includes a touch detector to detect a touch applied to a finishing layer associated with the hidden touch surface; a touch sensor to sense an attribute associated with the touch; and a processor to associate the attribute with a predetermined command, wherein the finishing layer hides the hidden touch surface.

14 Claims, 6 Drawing Sheets

IMPLEMENTING A HIDDEN TOUCH SURFACE

BACKGROUND

Conventionally, touch screens are provided along with various devices. The touch screens have a visible input area, and the visible input area is engage-able by a user to perform an operation.

For example, in response to a user engaging the touch screen, the user can operate a variety of devices. If the touch screen is implemented in a vehicle, the user may be able to control a volume or setting for a vehicle audio system, the temperature, or the like.

In the above example, the touch screens maintain several properties. For instance, a visible input area is provided. Thus, a static location for the touch screen is employed. Further, the touch screens tend to be either capacitive or resistive in nature. Thus, in order to actuate a specific command, the user needs to touch a specific location (or a distance from a specific location).

In addition to touch screens, various touch surfaces may be used. For example, a touch pad in a rectangular area adjacent to an operator may also be implemented. The touch surface works similarly to the touch screen, and detects various coordinates associated with a touch.

The above implementations may be disadvantageous to certain users. For example, certain users may not physically be capable of reaching a statically placed touch screen (e.g. due to a disability or limitation). Further, because capacitive and resistive touch technologies require a coordinate based input, the options provided along with the touch screen may be limited to merely detecting a position of the touch.

DESCRIPTION OF THE DRAWINGS

The detailed description refers to the following drawings, in which like numerals refer to like items, and in which.

DETAILED DESCRIPTION

Figure 1:
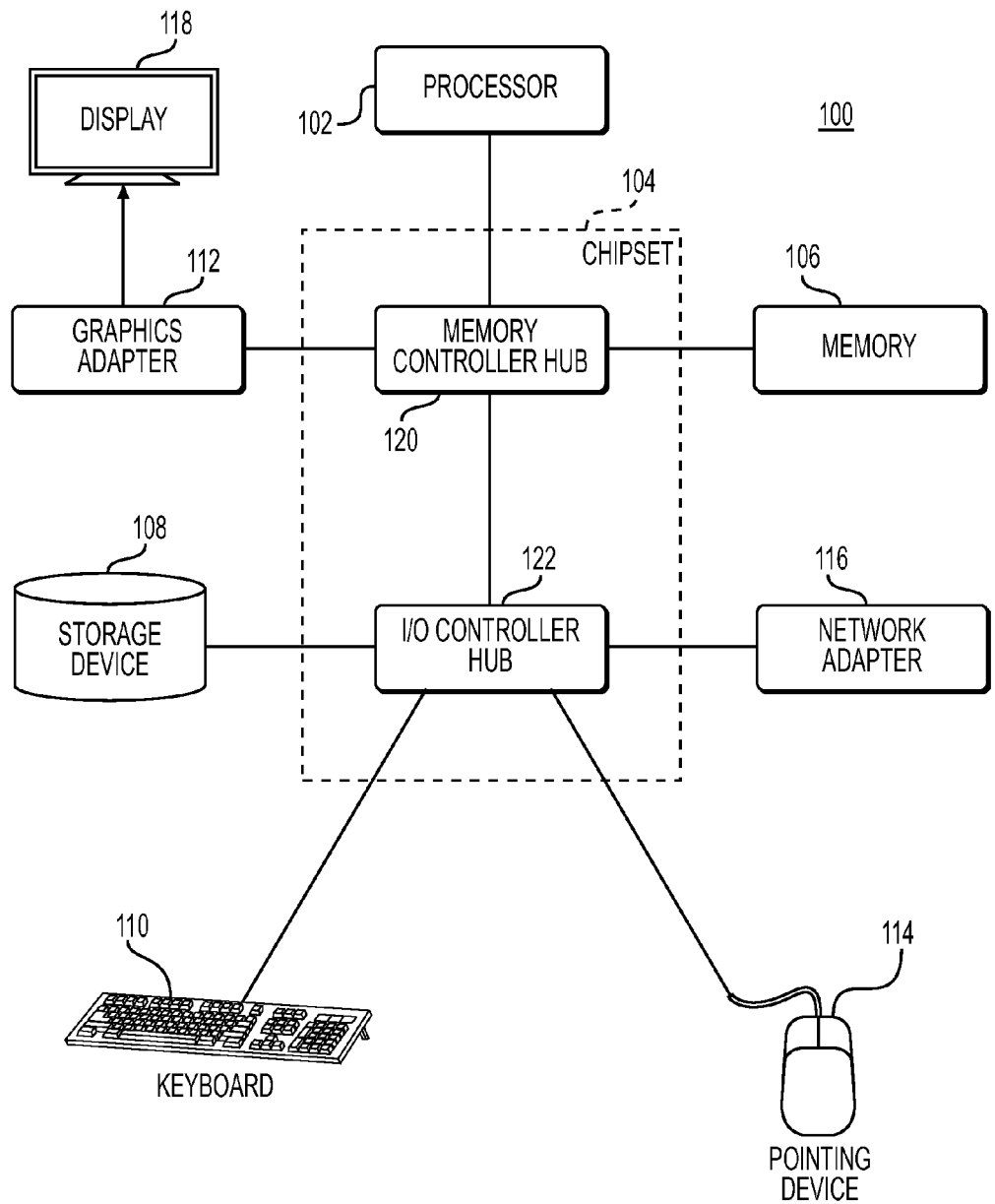
FIG. 1 is a block diagram illustrating an example computer.

The invention is described more fully hereinafter with references to the accompanying drawings, in which exemplary embodiments of the invention are shown. This invention may however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained in the background section, the conventional touch screens are statically provided, and are limited to sensing a coordinate of a touch. Thus, based on the coordinate of the touch, the touch screen may actuate an input.

However, due to the static location of the touch screen, the touch screen may not be optimal for certain users. For example, certain users may have a limitation or disability that prevents them from using the touch screens efficiently. Thus, the users may not have an efficient or safe experience while using a static touch screen.

A touch screen technology with pressure sensing may be implemented. Pressure sensing touch screens not only detect a coordinate of a touch, but also detect the pressure and angular application of the touch as well. Thus, each touch or action to touch may have multiple ways to instigate a command.

Disclosed herein are methods and systems for providing a hidden touch surface, the touch surface being implemented with pressure and angular sensing. By implementing the methods and systems disclosed herein, a dynamic user interface may be provided. Accordingly, a user of the hidden touch surface may apply a touch, and a subsequent force, and control an application. In certain applications, such as a vehicular interface, an input mechanism may be provided that more effectively addresses that various users have different sizes and capabilities.

Further, by providing a touch surface with a pressure and angular detection technique, the user is provided an enhanced method of operating a device.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the 110 controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2A:
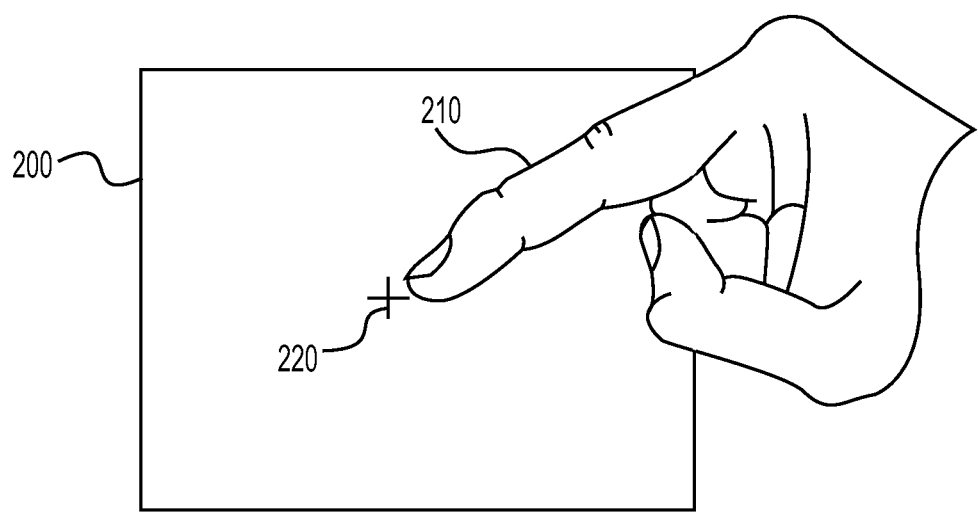
FIG. 2(a) is an example of a touch screen without pressure or angular sensing.
Figure 2B:
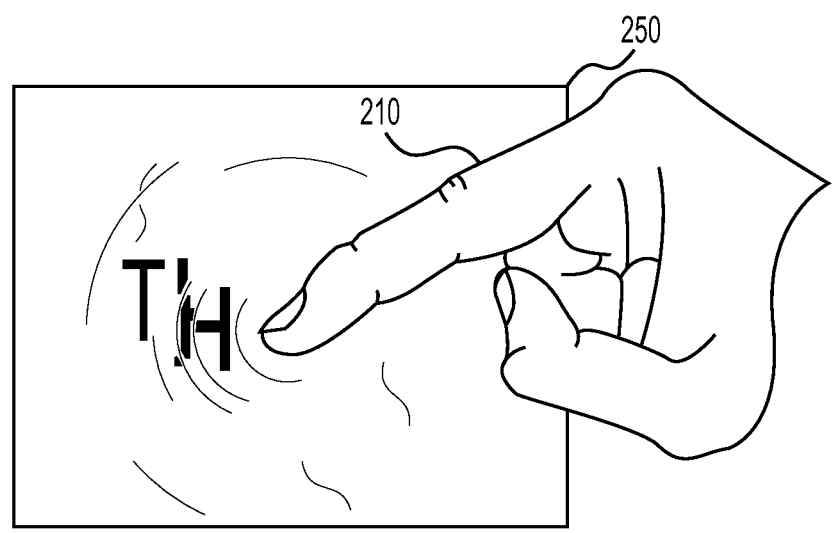
FIG. 2(b) is an example of a touch surface with pressure and angular sensing.

FIG. 2(a) is an example of a touch screen without pressure or angular sensing 200. FIG. 2(b) is an example of a touch surface with pressure or angular sensing 250.

Referring to FIG. 2(a), a touch screen without pressure or angular sensing 200 is shown. The touch screen 200 contains a point 220. In response to a finger 210 (or any pointing device) touching the touch screen 200 at the point 220, the touch screen 200 sends a signal to control circuitry (not shown) that indicates a coordinate associated with the point 220 has been initiated. The coordinate may be associated with a specific command. Further, the touch screen 200 may refresh and show different graphical user interfaces. Thus, the coordinate associated with the point 220 may update accordingly.

Referring to FIG. 2(b), a touch surface with pressure and angular sensing 250 is shown. In response to a finger 210 initiating a touch, a pressure and angle associated with the touch is sensed. The pressure may initiate a screen to display an icon or a menu item. The touch surface 250 may be pressed harder or softer, corresponding with a predetermined setting to initiate a command. For example, asserting more pressure may cause a menu to scroll at a speed corresponding to the pressure. Accordingly, applying more pressure to touch surface 250 may cause a menu on a display to scroll faster, while applying less pressure to touch surface 250 may cause a menu on a display to scroll slower.

Figure 3:
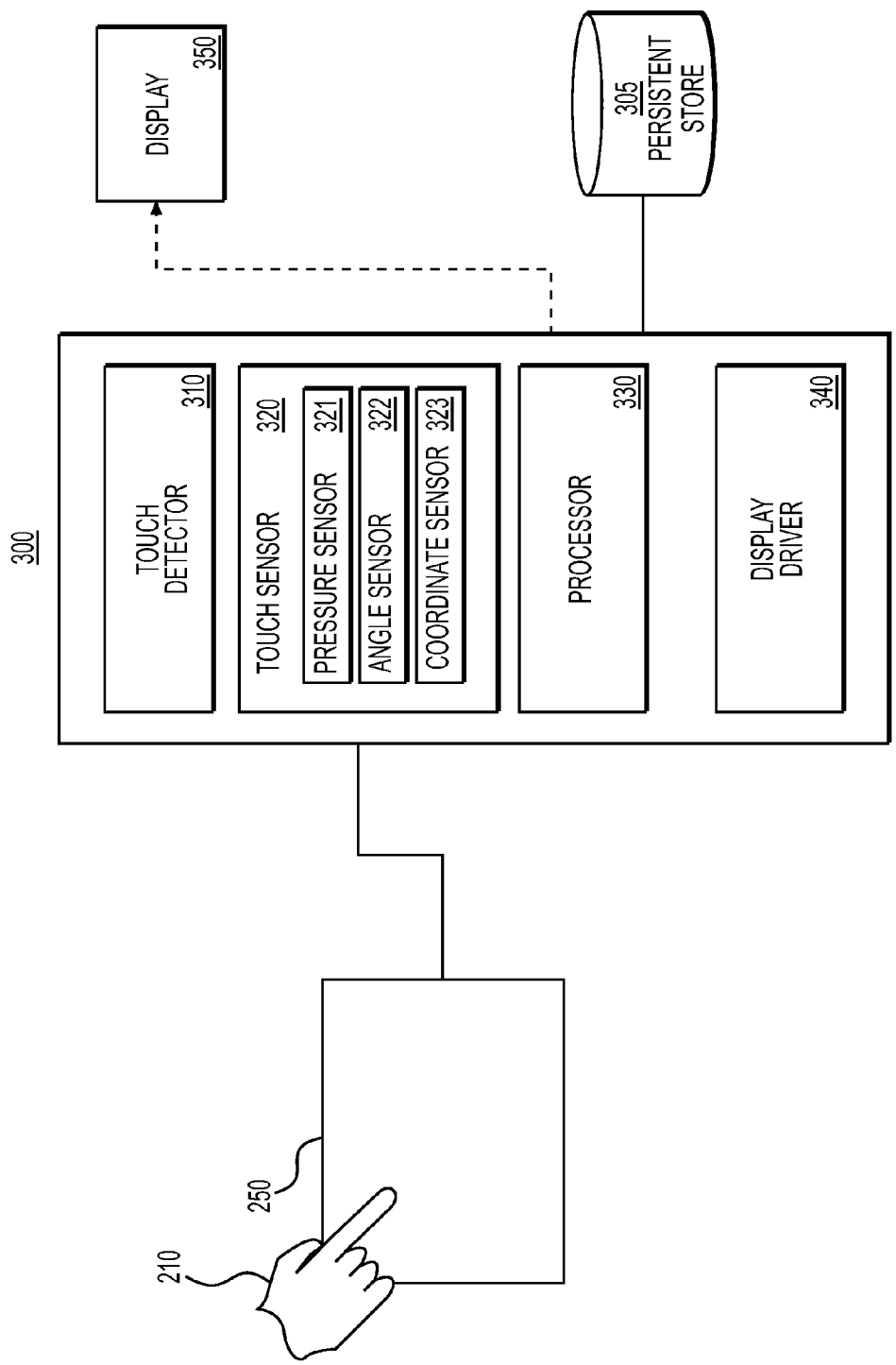
FIG. 3 illustrates an example of a system for implementing a hidden touch surface.

FIG. 3 illustrates a system 300 for implementing a hidden touch surface. The system 300 may be implemented on a system or device, such as computer 100. The system 300 includes a touch detector 310, a touch sensor 320, a processor 330, and a display driver 340 (which may be selectively incorporated based on an implementer of system 300's preference).

The system 300 is coupled (either through wired or wireless connections) to a touch surface 250. The touch surface 250 may be embedded under a finishing layer, such as the upholstery of the interior of a vehicle. Thus, because the touch surface 250 employs non-contact touch detecting, the touch surface 250 does not need to be visible to an operator.

The system 300 may be selectively coupled with a display 350. If the controls associated with the system 300 are employed to manipulate icons or user interface elements on a display, the display 350 may be updated accordingly in response to a finger 210 initiating contact with the touch surface 250.

The touch detector 310 detects an input to the touch surface 250. Various triggers (which will be described in greater detail below) may instigate a detected touch. For example, the touch surface 250 may detect pressure being applied onto the touch surface 250, the change of pressure from one location to another on the touch surface 250, or the change of pressure on the same location.

The touch sensor 320 senses an attribute of the touch applied onto the touch surface 250. The touch sensor 320 includes a pressure sensor 321, an angle sensor 322, and a coordinate sensor 323. The various elements, 321-323, may be selectively implemented.

As shown in FIG. 3, the detecting and sensing are done with separate elements. However, one of ordinary skill in the art may implement both features in an integrated process.

The pressure sensor 321 detects a pressure associated with the touch. For example, finger 210 may apply a soft touch, or a relatively harder touch to the touch surface 250. In response, the pressure sensor 321 may interpret the touch applied, and correlate a pressure with an action. For example, a harder touch may correspond to a faster scroll on a menu item displayed via display 350. Conversely, a softer touch may correspond to a slower scroll. In another example, a harder touch may correspond to a scroll in one direction, while a softer touch may correspond to a scroll in an opposite direction.

The angle sensor 322 may detect an angle of the finger 210's touch relative to the touch surface 250. Thus, if the finger 210's angle changes, the system 300 may sense the new angle, and control a device, such as display 350, accordingly.

For example, based on a detected change in angle, the display 350 may be adjusted based on the detected change. If an operator moves their finger, or touching device closer to a surface (i.e. reducing the angle of touch), the display 350 may move in that direction. Accordingly, a scrolling speed may be adjusted to be faster or slower. In another example, a panning function or zoom may be adjusted based on a detected angle change.

The coordinate sensor 323 senses a coordinate of the touch. The coordinate sensor 323 may detect a difference is located between the current touch and a subsequent touch as well. The difference in location of each touch may correspond to a predetermined command.

The processor 330, based on the sensed touch via the touch sensor 320, is configured to perform a predetermined action. The predetermined action may be configured by an implementer of system 300, or by the operator of the touch surface 250. As stated above, various actions may correspond to different applied pressure on to the touch surface 250, different angular applications of a touch onto the touch surface 250 or differences in coordinates of various touches on the touch surface 250.

The processor 330 may interact with a persistent store 305, The persistent store 305 may be any of the storage devices enumerated above in regards to storage device 108.

The display driver 340 updates a display associated with the touch surface 250 onto a display 250. For example, if the system detects a touch (via the touch detector 310), senses that harder pressure is applied via the touch (via the pressure sensor 321), and that action is correlated to scrolling upwards (via the processor 330)—the display driver 340 may instigate the display 350 to perform an action of scrolling a menu item upward.

Figure 4A:
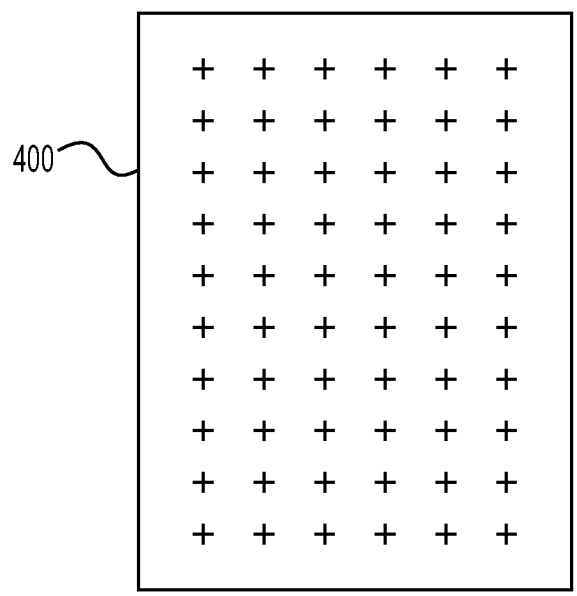
FIGS. 4(a)-(c) illustrate an example of a hidden touch surface implemented in a vehicle.
Figure 4B:
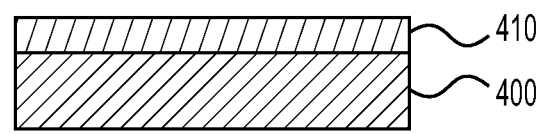
Figure 4C:
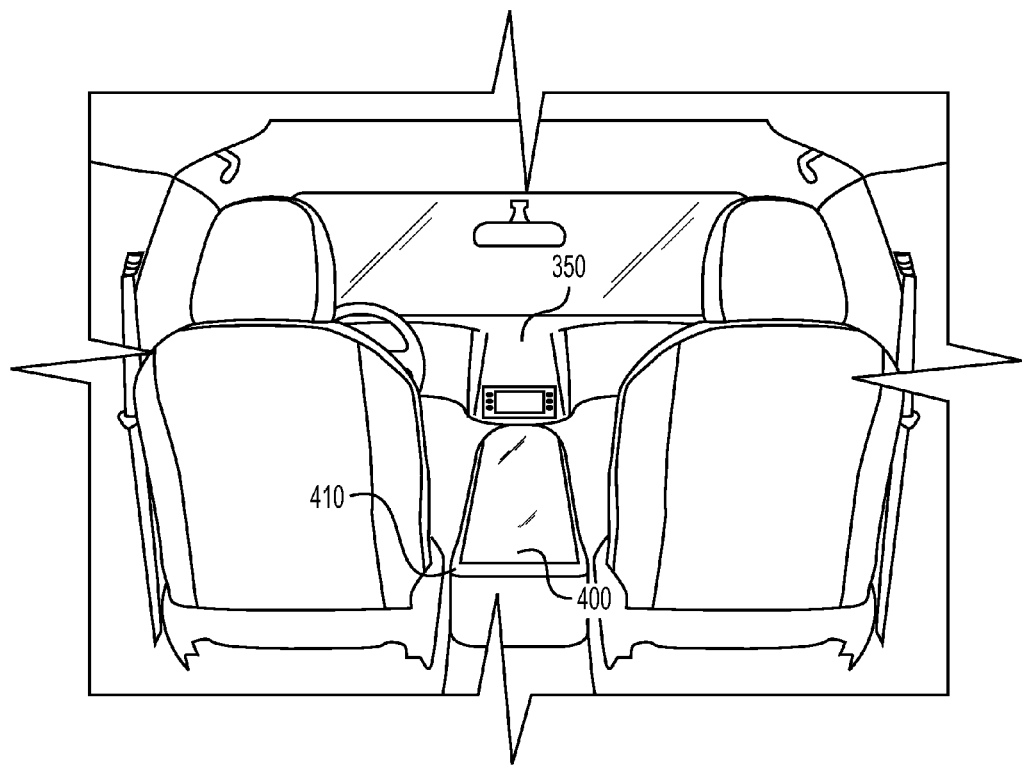

FIGS. 4(a)-(c) illustrate an example of a hidden touch surface 400 implemented in a vehicle. The hidden touch surface 400 is implemented along with system 300. The hidden touch surface 400 is shown along with a vehicle interface. One of ordinary skill in the art may implement the hidden touch surface 400 with any application benefiting with a touchable interface.

Referring to FIG. 4(a), a hidden touch surface 400 is shown. The hidden touch surface 400 may be implemented with a film-like touch input pad. Accordingly, the film like touch input pad may sense a coordinate of the touch, a pressure of the touch, and an angle of the touch applied to the hidden touch surface 400.

Referring to FIG. 4(b), the hidden touch surface 400 is placed under a finishing layer 410. The finishing layer 410 may be any surface commonly used in interiors of vehicles. For example, the finishing layer 410 may be a rubber or leather layer provided to present an aesthetically pleasing look to the operator of the vehicle. Because the finishing layer 410 is applied over the hidden touch surface 400, the touch surface 400 is not visible to the operator of the vehicle.

Referring to FIG. 4(c), an image of the vehicle from an interior location is shown. The finishing layer 410 and the hidden touch surface 400 are provided in an area between the front seats of a vehicle (for example, the area near a placement conventionally employed for an arm rest). As shown, a display 350 is also provided (in a cockpit area of the vehicle). Thus, in response to a finger applying a touch to the finishing layer 410, the hidden touch surface 400 detects the touch, and senses and attribute of the touch. Accordingly, via system 300, the display 350 is adjusted.

The aspects disclosed above may be implemented along with other controls of the vehicle, such as the temperature, the lighting, communication, and the like. As shown, because the touch surface is an area adjacent to where a driver is situated at, the touching and control of a display 350 potentially becomes more accessible for users with different desires and capabilities. For example, users with limited range of motion may find that activating a touch surface adjacent to where they sit may be more ideal and convenient. Also, because the touch surface is hidden, various areas may be configured for each user's preference. Thus, certain users may have the touch surface in a portion of the vehicle that is closer to their person, while other users may have the touch surface further away.

Figure 5:
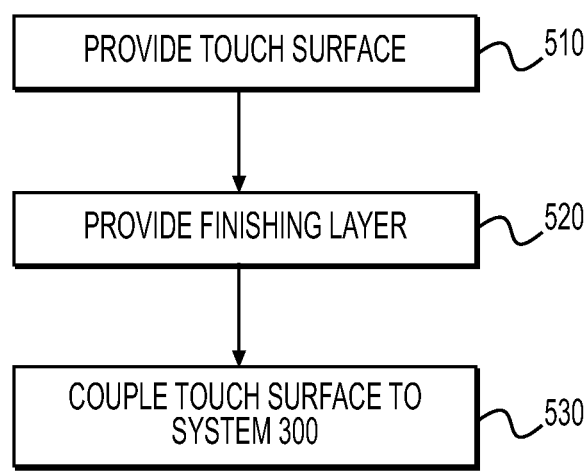
FIG. 5 illustrates a method for implementing a hidden touch surface.

FIG. 5 illustrates a method 500 for implementing a hidden touch surface. The method 500 may be implemented in a vehicle, such as the example shown in FIG. 4.

In operation 510, a touch surface is provided. The touch surface may be similar or the same as touch surface 250. Accordingly, the touch surface provided in operation 510 may be equipped with a pressure sensor, an angle sensor, or a coordinate sensor (or various combinations thereof).

In operation 520, the touch surface is placed under a finishing layer. The finishing layer, for example, may be the upholstery of a vehicle interior. The touch surface may be applied so that it still may detect a touch (or pressure caused by the touch), and be hidden by the finishing layer. The touch surface may be adhered in any way known to one of ordinary skill in the art.

In operation 530, the touch surface and the finishing layer are situated in a predetermined area and coupled to system 300. System 300 may communicate to the touch surface and the finishing layer in a wired or wireless fashion. Further, the system 300 may be coupled to a display, such as display 350.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for implementing a hidden touch surface, comprising:
   a touch detector to detect a touch applied to a finishing layer associated with the hidden touch surface;
   a touch sensor to sense an attribute associated with the touch;
   a display driver to drive a display associated with the vehicle; and
      a processor to associate the attribute with a predetermined command, wherein the finishing layer hides the hidden touch
      the hidden touch surface is placed in an interior of a vehicle, and
      the display is separately provided from the hidden touch surface.

2. The system according to claim 1, wherein the finishing layer is the vehicle's upholstery.

3. The system according to claim 2, wherein the upholstery is situated in a portion of the vehicle reserved for an armrest.

4. The system according to claim 2, wherein the finishing layer is rubber.

5. The system according to claim 2, wherein the finishing layer is leather.

6. The system according to claim 1, wherein the display is installed in a cockpit of the vehicle.

7. The system according to claim 1, wherein the touch sensor further comprises a pressure sensor, and the attribute is a pressure associated with the detected touch.

8. The system according to claim 1, wherein the touch sensor further comprises an angle sensor, and the attribute is angle of the detected touch relative to the hidden touch surface.

9. The system according to claim 8, wherein a scroll speed of a graphical user interface coupled to the hidden touch surface is determined by detecting a specific pressure of the pressure detector.

10. The system according to claim 1, wherein the touch sensor further comprises a coordinate sensor, and the attribute is a coordinate of the detected touch.

11. The system according to claim 1, wherein the touch sensor further comprises at least one of: a pressure sensor, an angle sensor, and a coordinate sensor.

12. The system according to claim 1, wherein the touch detector employs non-capacitive touch technology.

13. The system according to claim 7, wherein a scroll speed of a graphical user interface coupled to the hidden touch surface is determined by detecting a specific angle of the angle detector.

14. A method for implementing a hidden touch surface in a vehicle, comprising:
   providing a touch surface;
   forming a finishing layer to cover the touch surface;
   coupling the touch surface to an operation of the vehicle; and
   providing a display to be controlled via the touch surface,
      wherein the finishing layer is disposed to completely hide the hidden touch surface, and
      the hidden touch surface is placed in an interior of a vehicle, and
         the display is separately provided from the hidden touch surface.

* * * * *